United States Patent
Hussmann

(10) Patent No.: US 7,299,009 B2
(45) Date of Patent: Nov. 20, 2007

(54) BLUE-TOOTH ASSISTED WIRELESS LOCAL AREA NETWORK (WLAN) HOME NETWORK SYSTEMS

(75) Inventor: Holger Hussmann, Tampere (FI)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 10/788,089

(22) Filed: Feb. 25, 2004

(65) Prior Publication Data

US 2005/0186906 A1    Aug. 25, 2005

(51) Int. Cl.
*H04B 7/00* (2006.01)
(52) U.S. Cl. .................. 455/41.2; 455/450; 455/445; 455/552.1
(58) Field of Classification Search ............. 455/41.2, 455/90.2, 552.1, 553.1, 454, 63.1, 445, 450, 455/455, 296, 453
See application file for complete search history.

(56) References Cited

U.S. PATENT DOCUMENTS

| 6,680,923 | B1 | | 1/2004 | Leon ........................ 370/328 |
|---|---|---|---|---|
| 6,804,532 | B1 | * | 10/2004 | Moon et al. ............. 455/552.1 |
| 6,961,573 | B1 | * | 11/2005 | Moon et al. ............... 455/445 |
| 2003/0118015 | A1 | * | 6/2003 | Gunnarsson et al. ........ 370/389 |
| 2003/0236890 | A1 | | 12/2003 | Hurwitz et al. ............. 709/227 |
| 2004/0029619 | A1 | * | 2/2004 | Liang et al. ............. 455/562.1 |
| 2004/0176122 | A1 | * | 9/2004 | Godfrey ..................... 455/509 |
| 2005/0020209 | A1 | * | 1/2005 | Camp, Jr. .................. 455/41.2 |
| 2005/0075130 | A1 | * | 4/2005 | Godfrey ................... 455/552.1 |
| 2005/0192048 | A1 | * | 9/2005 | Bridgelall ................ 455/553.1 |
| 2005/0239474 | A9 | * | 10/2005 | Liang ......................... 455/454 |
| 2006/0075100 | A1 | * | 4/2006 | Stirbu ........................ 709/225 |

* cited by examiner

*Primary Examiner*—Edward F. Urban
*Assistant Examiner*—Blane J. Jackson
(74) *Attorney, Agent, or Firm*—Foley and Lardner LLP

(57) ABSTRACT

A method, device, and system use Bluetooth-assisted communication in a wireless local area network (WLAN). The method includes communicating with a wireless network using a wireless local area network (WLAN) interface, establishing an inactive mode based on communication activity with the wireless network, communicating with the wireless network using a Bluetooth interface, and establishing an active mode based on communication activity with the wireless network. The inactive mode disables the WLAN interface and the active mode enables the WLAN interface.

15 Claims, 2 Drawing Sheets

BLUE-TOOTH ASSISTED WIRELESS LOCAL AREA NETWORK (WLAN) HOME NETWORK SYSTEMS

FIELD OF THE INVENTION

The present invention relates to systems and methods for wireless network communications.

BACKGROUND OF THE INVENTION

Consumers are acquiring, viewing, and managing an increasing variety of digital media on devices in the consumer electronics (CE), personal computer (PC), and mobile domains. In addition, consumers want to easily and conveniently enjoy this content using any electronic devices located anywhere in the home. Such electronic devices may include music players, cameras, camcorders, DVD players, mobile phones, personal digital assistants (PDAs), and computers.

Wireless networks can include a wireless local area network (WLAN). A series of standards for wireless local area networks (WLANs) known as the IEEE 802.11 standards have been widely adopted and gained acceptance. In general, the IEEE 802.11 standard for WLANs is a standard for systems that operate in the 2,400-2,483.5 MHz band. It provides 1 to 2 Mbps transmission. The 802.11 RF transmissions use multiple signaling schemes (modulations) at different data rates to deliver a single data packet between wireless systems. The 802.11a standard is an extension to 802.11 that applies to wireless LANs and provides up to 54 Mbps in the 5 GHz band. The 802.11b standard (also referred to as 802.11 High Rate or Wi-Fi) is an extension to 802.11 that applies to wireless LANs and provides 11 Mbps transmission (with a fallback to 5.5, 2 and 1 Mbps) in the 2.4 GHz band. The 802.11g standard applies to wireless LANs and provides 20+Mbps in the 2.4 GHz band.

Wireless networks can also include the use of Bluetooth. Bluetooth is a global standard for wireless connectivity, which is based on a low-cost, short-range radio link. When two Bluetooth devices are within a range of ten meters, they can establish a connection together using a radio-based link. As an example, a laptop computer enabled with Bluetooth can send information to a printer in the next room, or a microwave oven can send a message to a mobile phone to announce that that a meal is ready. Bluetooth is becoming accepted as a standard in mobile phones, personal computers, laptops and other electronic devices that enables users to share information, synchronize data, access the Internet, integrate with local area networks or actuate electromechanical devices such as unlocking a car door.

The Digital Home Working Group (DHWG) was introduced in June 2003 as a cross-industry organization of leading consumer electronics, computing industry, and mobile device companies established to develop guidelines to provide CE, mobile, and PC vendors with information needed to build interoperable digital home platforms, devices, and applications. The DHWG defines implementation guidelines for digital home devices, which will be interconnected with IP networking technology.

Current proposals in the DHWG include multicast message filtering to block frequent Universal Plug and Play (UPnP) service announcements, in a logical bridging unit between the home network and a Bluetooth extension. As such, devices implementing Bluetooth are shielded from such messages, and are therefore able to enter a sleep state, which results in a long operating times of such battery powered devices. Nevertheless, as WLAN is an integral part of the non-battery powered stationary devices communications, WLAN devices are continuously disturbed with UPnP multicast messages and, therefore, are not be able to enter sleep states for longer periods.

U.S. Patent Application No. 2003/0236890 describes the use of different transport layers (e.g., Bluetooth and WLAN) for power saving reasons, but it does not describe use of Bluetooth as a control channel.

Thus, there is a need to have efficient sleep modes for WLAN devices in the home network. Further, there is a need to utilize Bluetooth and WLAN technologies to achieve high throughput while obtaining efficient modes, such as efficient sleep modes. Yet further, there is a need to use Bluetooth as a control channel while using WLAN for active state communications.

SUMMARY OF THE INVENTION

The present invention is directed to an architecture where mobile devices use the Bluetooth bearer as a control channel to stay connected to the home network and to send within the required periods the necessary still-alive messages to stay a member of the network. If the WLAN interface is closed, the device is solely connected via Bluetooth. In case a connection or a service is requested from the mobile device, the request is sent via the Bluetooth channel. Within the mobile terminal, a signaling interface between the Bluetooth unit and the WLAN unit is included. In case a connection set-up request is received via Bluetooth, the WLAN interface is triggered and further connections are carried out via WLAN, which can offer the required connection or service parameters.

Briefly, one exemplary embodiment relates to a method for Bluetooth-assisted communication in a wireless local area network (WLAN). The method includes communicating with a wireless network using a wireless local area network (WLAN) interface, establishing an inactive mode based on communication activity with the wireless network, communicating with the wireless network using a Bluetooth interface, and establishing an active mode based on communication activity with the wireless network. The inactive mode disables the WLAN interface and the active mode enables the WLAN interface.

Another exemplary embodiment relates to a device having Bluetooth-assisted communication in a wireless local area network (WLAN) system. The device includes a Bluetooth interface that communicates with a wireless network using the Bluetooth protocol, a WLAN interface that communicates with the wireless network using the WLAN protocol, and a software unit coupled to the Bluetooth interface and the WLAN interface. The software unit includes programmed instructions to disable the WLAN interface in an inactive mode and enable the WLAN interface in an active mode. The software unit also has programmed instructions used to determine whether the device is in active mode or inactive mode.

Yet another exemplary embodiment relates to a system for Bluetooth-assisted communication in a wireless network. The system includes a number of devices communicating over a wireless network, a Bluetooth communication channel, and a high rate communication channel. At least one of the number of devices includes a Bluetooth interface, a high rate interface, and a software unit coupled to the Bluetooth interface and the high rate interface. The software unit disables the high rate interface in an inactive mode and enables the high rate interface in an active mode. Further, the software unit determines whether the device is in active mode or inactive mode.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 1:
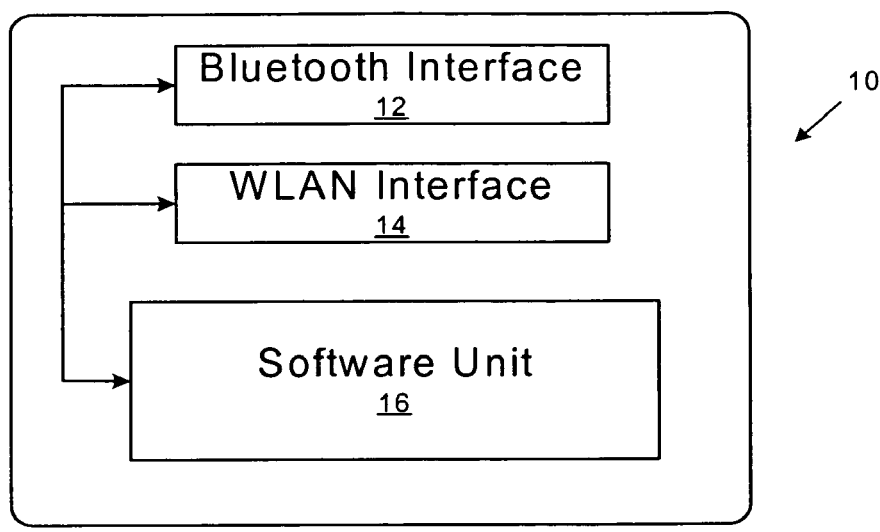
FIG. 1 is a diagrammatic representation of a mobile device having a Bluetooth interface and a WLAN interface in accordance with an exemplary embodiment.

FIG. 1 illustrates a mobile device 10 including a Bluetooth interface 12, a WLAN interface 14, and a software unit 16. Both the Bluetooth interface 12 and the WLAN interface 14 are controlled by programmed instructions in the software unit 16 inside the mobile device 10. The software unit 16 can receive control commands via the Bluetooth interface 12 and wake up the WLAN interface 14 in case the WLAN interface 14 is required.

In the situation where the WLAN interface 14 is inactivated and activated via a command from the Bluetooth interface 12, the mobile device 10 consumes less current. When the WLAN interface 14 is active but the mobile device 10 is not in use, unnecessary traffic is received by the mobile device. The Bluetooth interface 12 can stay active when the mobile device 10 is not used. This activity extends the wireless interface with a Bluetooth based control channel, making it possible to keep the logical interface active. Therefore, wireless services stay available without tremendous additional power consumption.

Figure 2:
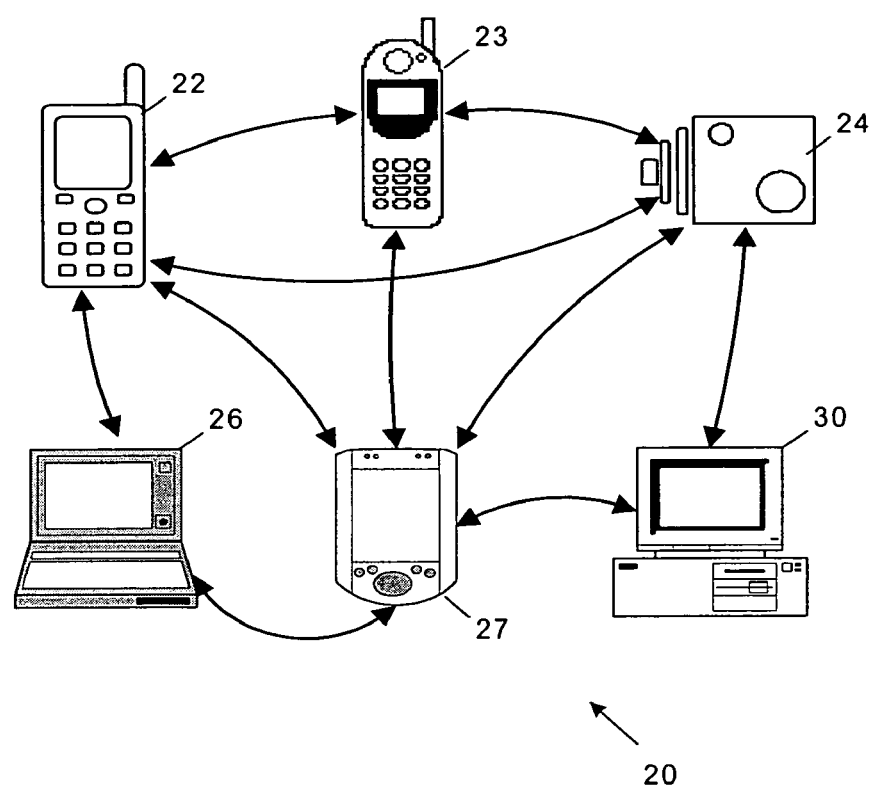
FIG. 2 is a diagrammatic representation of a wireless network in accordance with an exemplary embodiment.

FIG. 2 illustrates a home wireless system 20 including mobile devices, such as a phone 22, a cell phone 23, a camera 24, a laptop computer 26, and a personal digital assistant (PDA) 27 and non-mobile devices, such as a computer video game system 28 and a desktop computer 30. The devices in the home wireless system 20 use Bluetooth communications as a control channel during an inactive mode to stay connected to the network and send the necessary still-alive messages to stay member of the network within the required periods. Bluetooth wireless technology has a very efficient sleep mode. However, WLAN has higher throughput, making it the communication choice for applications such as video and high quality audio.

Some of the devices in the home wireless system 20 can be "plug and play" devices, meaning they can be used without an extensive configuration process. Plug and play standards have the intention of concealing unpleasant details, such as IRQ (interrupt request) and DMA (direct memory access) channels, from people who just want to add a new board, drive, or other chunk of hardware to their system.

Universal Plug and Play (UPnP) devices advertise themselves (i.e., broadcast a signal) frequently to inform other UPnP devices about the available services. The UPnP devices in such a network can either stay connected to those advertisements, or miss the current service situation. The devices in the home wireless system 20 can utilize multicast filtering to protect devices attached to the network through Bluetooth from UPnP messages. In the situation of a device having both a Bluetooth interface and a WLAN interface, such as the device 10 described with reference to FIG. 1, the device can only receive UPnP messages when the WLAN interface is in active mode.

Figure 3:
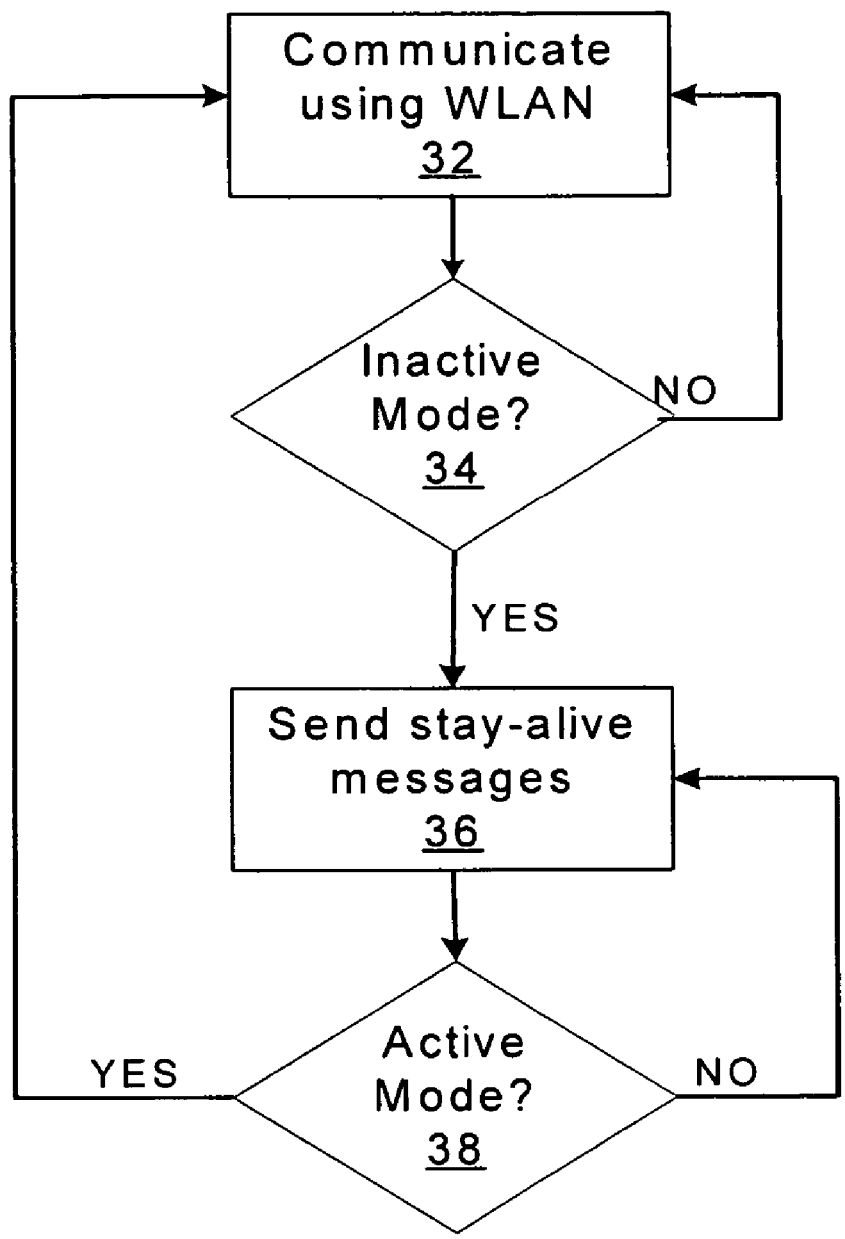
FIG. 3 is a flow diagram depicting operations in the communication of the mobile device of FIG. 1 including a Bluetooth interface and a WLAN interface in accordance with an exemplary embodiment.

FIG. 3 illustrates a flow diagram depicting operations performed in a Bluetooth-assisted WLAN network system. Additional, fewer, or different operations may be performed, depending on the embodiment. In an operation 32, a device communicates with a network using WLAN communications. The device can communicate any of a variety of media, including text, video, and audio. The device can also transmit over the network using Bluetooth technology, if the range is short enough and the transmission speeds needed are within the slower Bluetooth ranges.

In an operation 34, a determination is made as to whether the device has entered into a sleep or inactive mode. The inactive mode can be a state in which the device has not actively transmitted information to the network for a certain time period, such as 10 or 20 minutes. The inactive mode can also be defined as a state in which the device has not transmitted data requiring the capacities of the WLAN for a certain time period.

In an operation 36, the device uses Bluetooth communications as a control channel to stay connected to the network by sending the necessary still-alive messages to stay member of the network. When in an inactive state, the WLAN interface is closed, and the device is solely connected via Bluetooth. In case a connection or a service is requested from the mobile device, the request is sent via the Bluetooth channel. Within the mobile terminal, a signaling interface between the Bluetooth unit and the WLAN unit is utilized to activate the WLAN unit when the Bluetooth unit receives a connection or service request.

In an operation 38, a determination is made as to whether the device has entered active mode. Active mode can be entered due to a low level of activity at the device. Also, if a connection set-up request is received via Bluetooth, the WLAN interface is triggered into active mode and the further connection is carried out via WLAN, which may offer the required connection or service parameters. As such, the device can enter active mode when there is a request to use its services by another device. In this fashion, the efficiencies of the Bluetooth sleep mode and the throughput of WLAN can both be utilized.

This detailed description outlines exemplary embodiments of a method, device, and system for a Bluetooth-assisted WLAN network. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method for Bluetooth-assisted communication in a wireless local area network (WLAN), the method comprising:
   communicating with a wireless network using a wireless local area network (WLAN) interface;
   establishing an inactive mode based on communication activity with the wireless network, wherein the inactive mode disables the WLAN interface;
   communicating with the wireless network using a Bluetooth interface; and
   establishing an active mobile based on communication activity with the wireless network, wherein the active mode enables the WLAN interface when a connection request is received by the Bluetooth interface from the wireless network, and the requested connection requires activity of the WLAN interface.

2. The method of claim 1, wherein communicating with the wireless network using a Bluetooth interface comprises communicating still-alive messages with the wireless network within required periods of time to stay a member of the wireless network.

3. The method of claim 1, wherein establishing an inactive mode based on communication activity with the wireless network comprises determining that communication activity over a certain time period does not need communication capacities of a WLAN.

4. The method of claim 1, wherein the wireless network is a home wireless network connecting a plurality of devices located at a personal residence.

5. A device having Bluetooth-assisted communication in a wireless local area network (WLAN) system, the device comprising:
   a Bluetooth interface that communicates with a wireless network using the Bluetooth protocol;
   a WLAN interface that communicates with the wireless network using the WLAN protocol; and
   a software unit coupled to the Bluetooth interface and the WLAN interface and having programmed instructions to disable the WLAN interface in an inactive mode and to enable the WLAN interface in an active mode, the software unit having programmed instructions used to determine whether the device is in active mode or inactive mode, wherein the active mode is enabled when a connection request is received via the Bluetooth interface from the wireless network and the requested connection requires activity of the WLAN interface.

6. The device of claim 5, wherein the WLAN protocol comprises IEEE 802.11a, b, or g.

7. The device of claim 5, wherein the software unit determines the device is in inactive mode when communication needs are less than a predetermined communication capability.

8. The device of claim 7, wherein in the pre-determined communication capability is approximately a maximum Bluetooth protocol capability.

9. The device of claim 5, wherein the Bluetooth interface communicates still-alive messages with the wireless network within required periods of time to stay a member of the network during the inactive mode.

10. A system for Bluetooth-assisted communication in a wireless network, the system comprising:
    a number of devices communicating over a wireless network;
    a Bluetooth communication channel; and
    a high rate communication channel,
    wherein at least one of the number of the devices includes a Bluetooth interface, a high rate interface, and a software unit coupled to the Bluetooth interface and the high rate interface, the software unit disabling the high rate interface in an inactive mode and enabling the high rate interface in an active mode, the software unit farther determining whether the device is in active mode or inactive mode, and further wherein the active mode is enabled when a connection request is received via the Bluetooth interface from the wireless network and the requested connection requires activity of the high rate interface.

11. The system of claim 10, wherein the Bluetooth interface communicates still-alive messages with the wireless network within required periods of time to stay a member of the network during the inactive mode.

12. The system of claim 10, wherein the wireless network in a wireless local area network.

13. The system of claim 10, wherein the Bluetooth communication channel is a control channel during the inactive mode.

14. The system of claim 10, further comprising an internet protocol IP bridge that performs multicast filtering to protect devices attached through Bluetooth from Universal Plug and Play (UPnR) messages.

15. The system of claim 10, wherein the number of devices including the Bluetooth interface, the high rate interface, and the software unit are mobile devices.

* * * * *